(No Model.)
H. P. DENNIS.
AUTOMATIC WEIGHING AND FILLING APPARATUS.
No. 572,504. Patented Dec. 1, 1896.
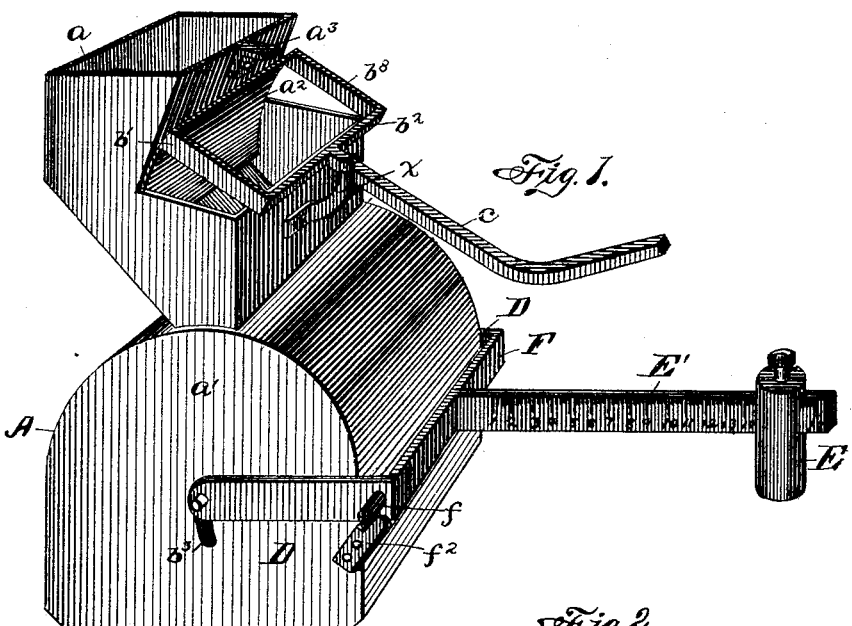
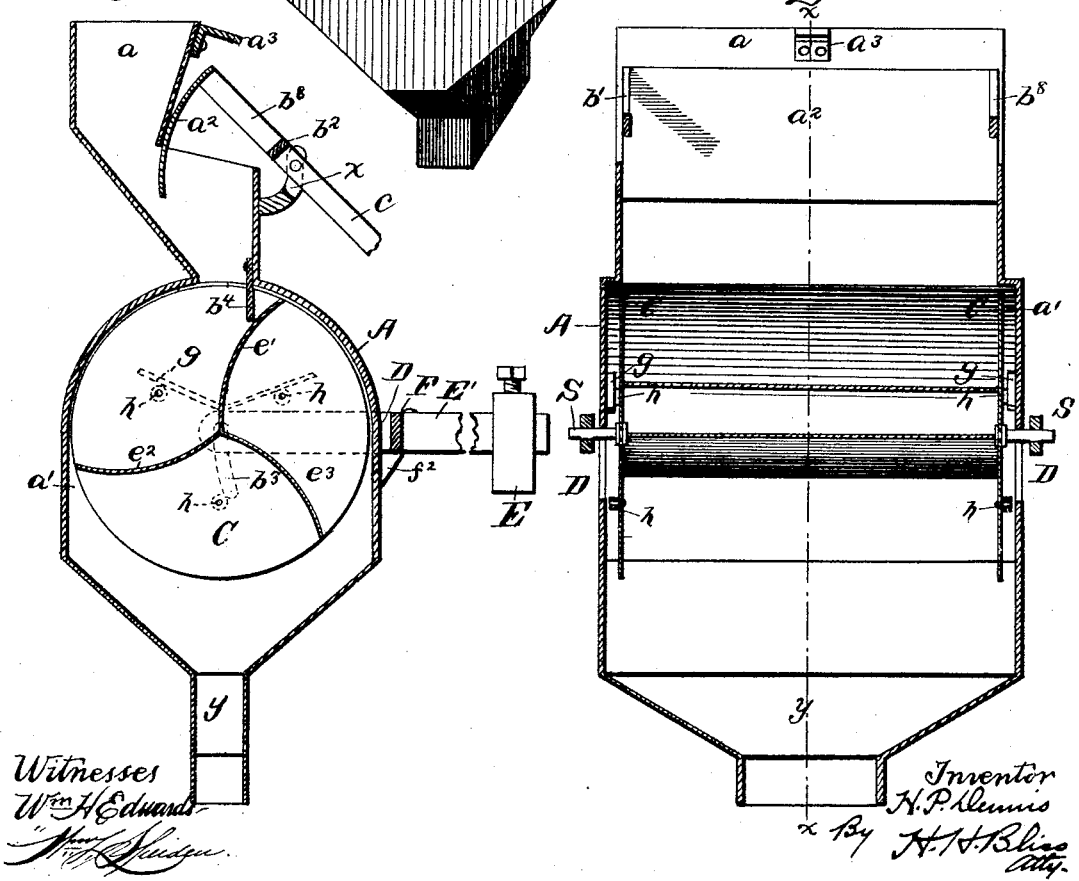

UNITED STATES PATENT OFFICE.

HENRY P. DENNIS, OF PEORIA, ILLINOIS, ASSIGNOR OF TWO-THIRDS TO JOHN H. ELLIS AND ALBERTUS D. POTTER, OF SAME PLACE.

AUTOMATIC WEIGHING AND FILLING APPARATUS.

SPECIFICATION forming part of Letters Patent No. 572,504, dated December 1, 1896.

Application filed January 11, 1894. Serial No. 496,557. (No model.)

*To all whom it may concern:*

Be it known that I, HENRY P. DENNIS, of Peoria, in the county of Peoria, State of Illinois, have invented certain new and useful Improvements in Automatic Weighing and Filling Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in automatic weighing and filling apparatus; and the object is to provide a simple and compact apparatus by which grain, meal, or any similar substance can be rapidly and accurately weighed and discharged automatically into suitable receptacles.

With this end in view my invention consists in the peculiar construction and arrangement of parts, as will be hereinafter fully pointed out and described.

In the accompanying drawings, Figure 1 is a perspective view of a weighing and filling apparatus embodying my improvements. Fig. 2 is a vertical sectional view through the apparatus. Fig. 3 is a sectional view on the line $x\,x$ of Fig. 2.

Like letters of reference denote corresponding parts in the several figures of the drawings, referring to which—

A designates the shell or casing of the apparatus, which may be of any suitable size and material. As shown, this shell is formed to provide an inlet-hopper $a$, a body $a'$, substantially circular in cross-section, within which are mounted the holders or receptacles in which the material is supported while being weighed, and a discharge-spout $y$.

Passage of material from the hopper $a$ to the weighing-compartment is controlled by means of a valve, preferably formed by a plate $a^2$, extending the entire width of the duct, connecting the hopper and weighing-compartment. This valve-plate is supported by parallel arms $b'\,b^8$, which are connected by a cross-bar $b^2$, to which is connected an operating handle or lever $c$. This handle or lever $c$ is fulcrumed in a suitable arm or bracket $x$, projecting out from the body of the case A. As shown in Fig. 2, the valve-plate $a^2$ is preferably curved slightly, so as to form a close joint with the sloping or inclined back wall of the duct between the hopper and the weighing-compartment. Upward movement of the valve $a^2$ is limited by a stop-lug $a^3$, attached to the front wall of the inlet-hopper $a$.

The material is supported during the operation of weighing in one or the other of a series of concavo-convex plates $e'$, $e^2$, and $e^3$. These plates are of such length as to extend practically throughout the length of the compartment $a'$ and of a width to extend from the center of such compartment to the inner face of the outer wall thereof. They are supported and connected by means of disks C, of such size as to revolve freely within the compartment $a'$, said disks being pivotally supported and connected with the weight-beam of the apparatus, as will be hereinafter described.

As shown, the graduated beam or bar $E'$, on which is arranged a sliding weight E, is connected with a bar or rod F, which is provided at its ends with knife-edge bearings $f$, for which holders or supports $f^2$ are provided at opposite ends of the shell A. Near each end the bar F is provided with an arm D, extending in the opposite direction from the weight-beam $E'$, and near their free ends these arms D have each an inwardly-projecting pin or stud S. These studs S extend through suitable openings in the end walls of the compartment $a'$ and have their free ends inserted in sockets formed in the outer faces of the aforesaid disks C. The disks C and the plates or partitions $e'\,e^2\,e^3$, forming the weighing-receptacle, are thus adapted to rotate about the pins S and also to vibrate vertically about the knife-edge fulcra $f$.

In order that the weighing-receptacle may be held from movement about the pivots S until the desired amount of material has been deposited in that pocket thereof which is in alinement with the mouth of the duct leading from the inlet-hopper, I provide means whereby such receptacle is normally held against rotary movement.

By reference to Fig. 3 it will be seen that I arrange in the upper portion of the compartment $a'$ a depending stop-plate $b^4$, which projects into such compartment to such an extent as to normally prevent rotary movement of the weighing-receptacle by reason of its contacting with one of the division-plates or partitions of that receptacle. I also provide a stop or guide (described below) at the end of the weighing-receptacle.

By reference to Fig. 1 it will be seen that the openings or slots $b^3$, through which the pins S extend, are of such length as to allow such pins to move vertically for a limited distance. On the inner face of the end walls of the compartment $a'$, above the said slots $b^3$, I arrange a stop $g$. As shown, this is made substantially V-shaped, it consisting of two short flat members, which extend from a common point a short distance above the upper end of the slot $b^3$ upwardly and outwardly. In connection with this V-shaped stop I provide the disks C with a series of rollers $h$, mounted on laterally-projecting studs. The rollers $h$ correspond in number with the number of compartments or divisions formed in the weighing-receptacle and are arranged at points equally distant from the center of the disk C.

When the valve $a^2$ is closed and the weighing-receptacle is empty, the stop-plate $b^4$ lies in the path of the division-plates $e'$, $e^2$, and $e^3$ and one or more of the rollers $h$ on the disks C contact with the lower side of the stops $g$, near the outer end thereof. As the valve $a^2$ is opened and material flows from the hopper $a$ into the weighing-receptacle the weight thereof causes the weighing-receptacle to gradually descend, the pins S passing downward in the slots $b^3$. After the weighing-receptacle has descended far enough to clear the stop-plate $b^4$ the weight in the pocket or division in line with the inlet-hopper causes the said receptacle to tend to revolve. This causes the rollers $h$ to ride against the under side of the stops $g$. At the time that the weighing-receptacle has reached its lowest vertical position the rollers $h$ will have passed from engagement or contact with the stops $g$ and the filled compartment of the receptacle will be brought into line with the discharge-spout $y$ and its contents automatically discharged therethrough.

What I claim as my invention, and desire to protect by Letters Patent, is—

1. In an automatic weighing apparatus, the combination with a casing, and a weight-beam, of a rotatable weighing-receptacle arranged within the casing and connected with the weight-beam to move vertically therewith, said receptacle consisting of two parallel heads or disks, and a series of plates or partitions connecting said disks, a stationary stop lying in the path of the said plates or partitions of the weighing-receptacle when the latter is in its uppermost position, a guide and stop bar rigidly secured to the casing adjacent to one of the heads or disks of the weighing-receptacle, and a series of laterally-projecting guide-rollers carried by said head or disk, one in line with each of the pockets or compartments of the receptacle, and adapted to successively contact with the said guide and stop bar on the casing, substantially as and for the purpose set forth.

2. In an automatic weighing apparatus, the combination with a casing, and a weight-beam, of a rotatable weighing-receptacle arranged within the casing and connected with the weight-beam to move vertically therewith, said receptacle being divided into a series of compartments or pockets, a stationary V-shaped stop secured to the inner face of the casing and having its members extending at an angle to, and in opposite directions from, the path of vertical movement of the axis of the receptacle, and guide-rollers carried by the receptacle, one in line with each pocket or compartment thereof, and situated at equal distances from the axis of the receptacle, adapted to contact with said V-shaped stop and guide, substantially as set forth.

HENRY P. DENNIS.

Witnesses:
WILLIAM T. SPIER,
LOUIE C. DENNIS.